(12) United States Patent
Aguren et al.

(10) Patent No.: US 6,628,205 B2
(45) Date of Patent: Sep. 30, 2003

(54) VISUAL METER FOR PROVIDING A LONG-TERM INDICATION OF DYNAMIC PARAMETERS

(75) Inventors: Jerry G. Aguren, Tomball, TX (US); Edward M. Flynn, Westboro, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/272,845

(22) Filed: Oct. 17, 2002

(65) Prior Publication Data

US 2003/0030926 A1 Feb. 13, 2003

Related U.S. Application Data

(62) Division of application No. 09/726,737, filed on Nov. 30, 2000, now Pat. No. 6,476,725.

(51) Int. Cl.[7] .................................................. G08B 5/00
(52) U.S. Cl. ..................... 340/815.4; 204/606; 345/107; 359/296
(58) Field of Search ......................... 340/815.4; 345/107, 345/85; 359/296; 204/606, 607; 349/86

(56) References Cited

U.S. PATENT DOCUMENTS

| | | | |
|---|---|---|---|
| 5,614,333 A | 3/1997 | Hughen et al. ............... 429/93 |
| 5,625,517 A | 4/1997 | Sawada et al. ............. 360/137 |
| 5,963,133 A | 10/1999 | Monjo ..................... 340/572.1 |
| 6,017,584 A | 1/2000 | Albert et al. ............ 427/213.3 |
| 6,067,185 A | 5/2000 | Albert et al. ............... 359/296 |
| 6,118,426 A | 9/2000 | Albert et al. ............... 345/107 |
| 6,120,588 A | 9/2000 | Jacobson ................... 106/31.16 |
| 6,120,839 A | 9/2000 | Comiskey et al. ........ 427/213.3 |
| 6,124,851 A | 9/2000 | Jacobson ..................... 345/206 |
| 6,130,774 A | 10/2000 | Albert et al. ................ 359/296 |
| 6,172,798 B1 | 1/2001 | Albert et al. ................ 359/296 |
| 6,174,170 B1 | 1/2001 | Olmedo .................. 434/307 A |
| 6,177,921 B1 | 1/2001 | Comiskey et al. .......... 345/107 |
| 6,232,950 B1 | 5/2001 | Albert et al. ............... 345/107 |
| 6,249,271 B1 | 6/2001 | Albert et al. ............... 345/107 |
| 6,252,564 B1 | 6/2001 | Albert et al. .................. 345/1 |
| 6,262,706 B1 | 7/2001 | Albert et al. ............... 345/107 |
| 6,262,833 B1 | 7/2001 | Loxley et al. .............. 359/296 |
| 6,285,282 B1 | 9/2001 | Dorenbosch et al. 340/572.1 X |
| 6,300,932 B1 | 10/2001 | Albert ....................... 345/107 |
| 6,338,405 B1 | 1/2002 | Yoerg et al. ............. 206/308.1 |

*Primary Examiner*—Thomas J Mullen, Jr.

(57) ABSTRACT

A media meter mounts to a surface of a removable storage media or other product, and provides a visual indication of one or more parameters of the storage media or other product. The media meter includes circuitry that detects status signals transmitted by rf transmissions or directly connected by wires between an auxiliary memory device mounted on the storage media or product, or receives status signals via rf transmissions directly from the auxiliary memory. As another alternative, the media meter may be integrated with the auxiliary memory to receive status signals directly from the auxiliary memory. The status signals indicate the capacity of the storage media, the number of read and/or write errors that have occurred during back-up and retrieval, the number of times the storage media has been loaded with data or other information, and other dynamically-varying parameters. The media meter selects appropriate parameters to display, or may perform other analysis to determine other parameters of the storage media, such as the viability of the storage media. The media meter includes a parasitic power source that uses the rf communications to power the circuitry. The media meter includes a display device capable of maintaining a display of the selected parameter for extended periods.

10 Claims, 5 Drawing Sheets

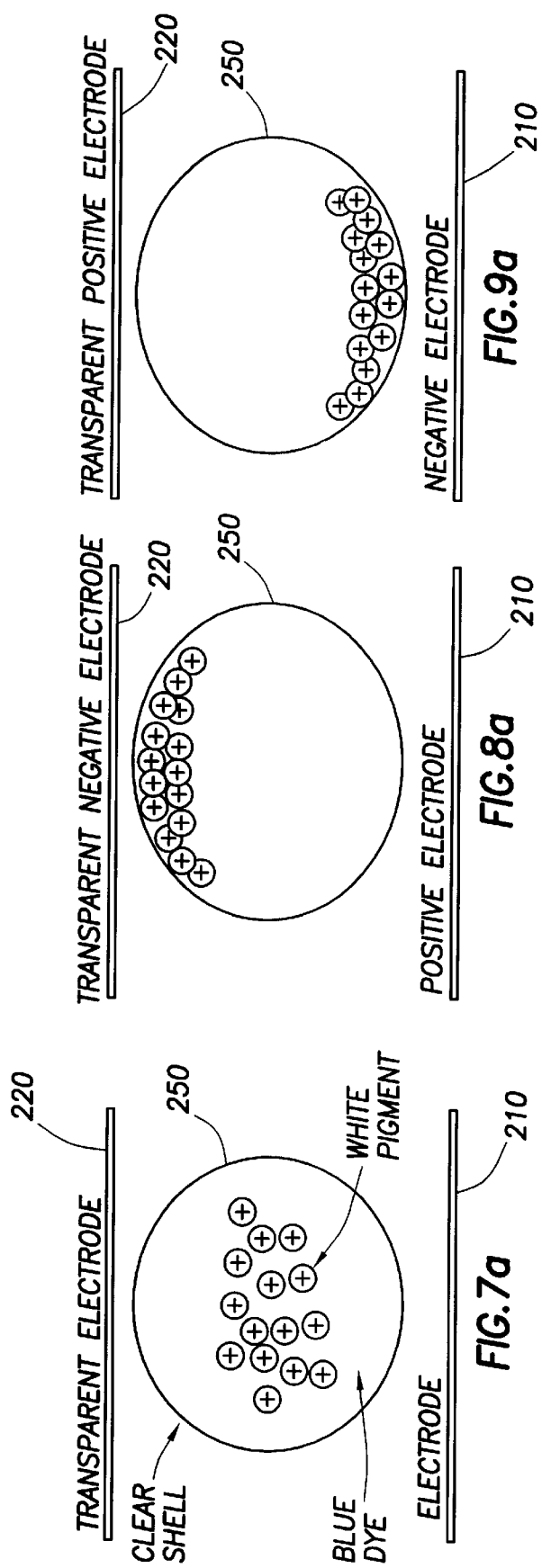

VISUAL METER FOR PROVIDING A LONG-TERM INDICATION OF DYNAMIC PARAMETERS

CROSS-REFERENCE TO RELATED APPLICATIONS

This application is a divisional of U.S. patent application Ser. No. 09/726,737, filed Nov. 30, 2000, now U.S. Pat. No. 6,476,725 and is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates generally to a visual indicator that may be used to display the status of dynamically varying parameters. More particularly, the present invention relates to a visual meter that can be attached to a removable storage media, or any other tangible product, to display the status of varying parameters. Still more particularly, the present invention relates to an electronic label that can be affixed to a removable storage media or other tangible product and that includes circuitry which provides a visual indication of one or more dynamic parameters relating to the removable storage media or product.

2. Background of the Invention

Bar code labels and other electronic marking labels have become commonplace in numerous industries as a way to label a tangible product or storage device. Bar code labels are commonly used on retail products to enable the bar code to be scanned to identify the product. Bar code labels are also used in manufacturing to identify the time and place that the product was manufactured. In the computer storage industry, bar code labels are commonly used to identify the storage medium, which then may be correlated with certain parameters regarding the storage medium in a computerized archiving system.

While bar code labels have the advantage of being small in size and relatively inexpensive, they suffer from the disadvantage that the bar code label cannot be used to indicate the status of a parameter that varies with time. Thus, as an example, a bar code label may be used to identify a battery by model number and date of manufacture, it cannot be used to indicate the life remaining on a battery. In certain industries, it is advantageous to be able to label products to indicate the state of dynamic parameters. The list of such products is massive, and includes removable storage medium, power supplies, manufacturing pieces, and virtually any product that requires maintenance or which has a fixed life. As an example of such products, the present invention will discuss removable storage media to explain the principles of the visual meter disclosed herein, with the understanding that the present invention is not limited to use only with such a product. The present invention may be used in conjunction with any type of storage product, and may be used outside the storage industry in other industries and fields that require use of a meter that can visually display a parameter that varies with time.

Removable storage media are used extensively by businesses and individuals to store data that is downloaded from computing and accounting systems. Typically, computer users will store or back-up data onto the removable storage media frequently to protect the integrity of that data in case the computer or operating system loses its data, or "crashes". The removable storage media also is used to free up memory space in the computer or network. Data is written or backed-up onto a removable storage media by a writing device that typically connects as a peripheral device to a computer system or network storage. Similarly, data is retrieved or restored from the back-up storage media through the use of a read device. Typically, a tape drive will include the capability to both read from and write to the removable storage media.

Methods and techniques for backing up data onto removable storage media vary. Usually, however, a user will maintain multiple back-up copies of data to insure the integrity of the stored data. For example, five different tape cartridges may be used in a rotating fashion to back-up all accounting data. Thus, for example, on Monday, tape 1 would be used to back-up the accounting data, while tapes 2, 3, 4 and 5 would be used on Tuesday, Wednesday, Thursday and Friday, respectively. In this fashion, each of the five tapes is supplemented once a week. As a result, if one tape fails or is lost on the same day that a computer crashes, at most only one day of data would be lost. Other users may decide to periodically maintain back-up tapes in an automated or robotic tape library for later reference. Thus, for example, a company may decide to back-up and store in a library or archive all accounting data that is present on the last day of each month.

An entire industry has evolved that relates to equipment and methods for backing-up data from a computer onto a tape cartridge, and for keeping an inventory of the many back-up tapes that may exist. For example, robotic library systems have been developed which include a robotic arm to automatically place tape cartridges into tape drives for backing up and restoring data. In these systems, the tape cartridge typically is identified by a bar code, which is read by a bar code scanner. The bar code usually comprises a label that is affixed to the cartridge. A central computer associates the bar code value with the position and content of each cartridge. The cartridges are maintained in a storage volume which is accessible by the robotic arm and bar code scanner. These library systems, typically are very expensive, and require expensive robotic handling equipment to handle the tapes. In addition, the bar code is not capable of retaining information regarding the tape life, capacity, and other dynamically changing parameters of the cartridge.

More recently, a number of companies have begun to market systems that permit the usage history and other information regarding removable storage media to be monitored and stored with the media. In these systems, an integrated circuit is placed either inside the storage media, or on an exterior surface of the media. The integrated circuit includes an auxiliary memory, such as an EEPROM, which can store certain information regarding the removable storage media. Information stored in auxiliary memory may include the capacity of the storage media, the manufacturer of the storage media, the number of times that the storage media was required to retry a write operation during back-up operations, the number of times that the storage media was required to retry a read operation during restore operations, the number of times that the storage media has been loaded with data, and the media pool with which the storage media is associated. The drive device accesses this information on the auxiliary memory through suitable circuitry mounted in the drive. The drive communicates with the auxiliary memory via either a direct electrical connection, or through radio frequency (rf) transmissions. If rf communication is used, an antenna is included with the auxiliary memory on the storage media, and an antenna is mounted with the circuitry in the drive. The circuitry in the drive may access the auxiliary memory either by write transactions (during which new data is loaded in the auxiliary memory), or by read transactions (during which data stored in the auxiliary memory is read by the drive circuitry). Companies who have introduced systems of this sort include Sony, which implements the AIT cartridge, and IBM, Seagate, Hewlett-Packard, which implements the LTO cartridge, and Quantum which implements SDLT.

The problem with these prior art auxiliary memory systems is that the information on the cartridge or other removable storage media can only be accessed by an appropriate circuit device that can communicate with the auxiliary memory. This occurs when the cartridge is in the drive. Customers have no method to read the auxiliary memory information when the cartridge is outside the drive. Many customers may only have a single drive that can communicate with the auxiliary memory, and access to that drive may not be readily available. Moreover, the information retrieved from the drive is not in a format that is readily useable. Typically, the information from the auxiliary memory must be input to a computer system that then must be programmed to incorporate that data into a format that can be reviewed by the user. Thus, for many consumers, the information that can be obtained from the auxiliary memory is not in a form that can be quickly reviewed by a consumer. It would be advantageous at certain times to be able to quickly determine certain status information regarding the storage media without placing the storage media in the vicinity of circuitry that can communicate with the auxiliary memory.

It would be advantageous if a system or device was developed that would permit a user to obtain certain information regarding a removable storage media or other tangible product without requiring access to a specialized device that must be used to communicate with auxiliary memory circuits mounted in or on the storage media or product. It would also be advantageous if a system or device was available which would permit a dynamic variable relating to a removable storage media or other product to be visually accessible without requiring connection to a computer system. Despite the apparent advantage that such a system would have, to date no such system has become available.

BRIEF SUMMARY OF THE INVENTION

The deficiencies and shortcomings of the prior art are solved by a visual meter that attaches to a removable storage media or other tangible product and which includes a display for indicating certain dynamic status information relating to storage media or product. The visual meter may be selected to display particular information, such as the remaining capacity of the storage media, the viability of the storage media or product for continued use, the number of errors that have occurred while reading from and writing to the storage media, and any other desired status information. The display preferably comprises a graph with legends that denote the status of one or more dynamically changing parameters. According to the preferred embodiment, the graph provides a long-term visual indication of the state of the parameter, without any external power source.

According to the preferred embodiment, the visual meter is used in conjunction with an auxiliary memory circuit that is mounted in or on the removable storage media or other product and stores information regarding particular dynamic status parameters of the removable storage media or product.

The meter may either connect electrically to the auxiliary memory circuit, or may comprise a label that attaches to the removable storage media and which communicates with either the auxiliary memory or drive circuitry via rf transmissions or through a hard-wire connection. The meter preferably includes an rf receiver and a parasitic power source that converts rf transmissions to electrical power for operating the meter circuitry. The meter circuitry also preferably includes conditioning circuitry to convert the received rf transmissions to a digital signal. The meter also preferably includes a control circuit and a memory device that operate to store parameter data received from the drive or auxiliary memory. The control circuitry preferably selects particular parameter data for displaying on a suitable display device, through the use of associated drive circuitry. According to one embodiment, the control circuitry may be programmed to analyze the parameter data to determine the viability of the removable storage media or other product, based on past usage, the number of errors that have occurred during storage and retrieval of data, and the like.

The meter preferably includes a display device that may be attached as a label to a cartridge. According to one embodiment, the display comprises a semiconductor device that changes color based on the charge applied to the device. Preferably, the display has a long-life to provide a visual display for an extended period of time even after the cartridge has been removed from the tape drive. In addition, it is preferable that no external power source be required to maintain the readable value set on the label. According to the preferred embodiment, the display values are determined each time the cartridge is placed in a drive, or during any other situation in which the auxiliary memory is accessed by either a read or a write operation.

Additional details regarding the preferred embodiment of the present invention may be obtained from the detailed description of the preferred embodiment, drawings, and claims, which follow.

BRIEF DESCRIPTION OF THE DRAWINGS

For a detailed description of the preferred embodiments of the invention, reference will now be made to the accompanying drawings in which:

FIGS. 7A–B, 8A–B and 9A–B are drawings depicting the micro-encapsulated electrophoretic display elements used in the embodiments of FIGS. 3, 4 and 6;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "removable storage device" or "removable storage media" is intended to be construed broadly to include tape cartridges, hard drives, optical discs, memory sticks, memory cards, and other storage media that may be available now, or may become available in the future. Similarly, the term "product" is intended to be construed broadly to include any device that has a changing parameter which can be displayed, including parameters that change in the manufacturing process or during the normal operation or use of the device. To the extent that any term is not specially defined in this specification, the intent is that the term is to be given its plain and ordinary meaning.

DETAILED DESCRIPTION OF THE PREFERRED EMBODIMENTS

Figure 1A:
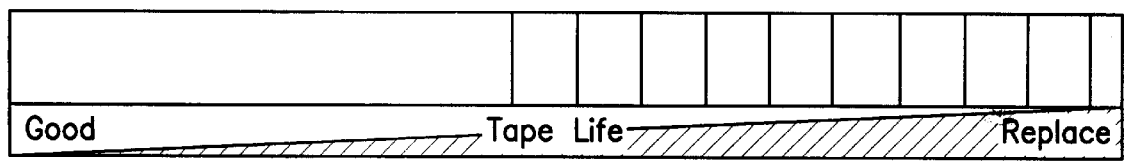
FIG. 1A depicts a visual meter mounted on a removable storage media in accordance with one exemplary embodiment of the present invention.
Figure 1B:
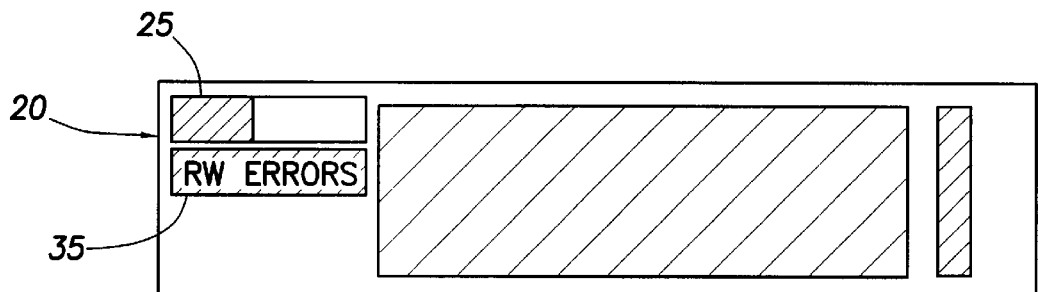
FIG. 1B depicts a visual meter that displays another parameter regarding a removable storage media or other product.
Figure 2:
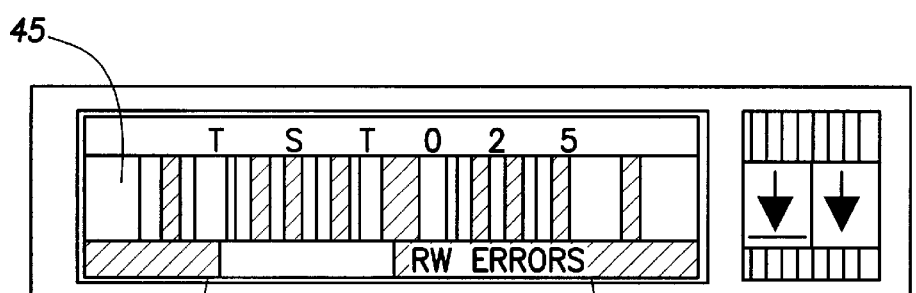
FIG. 2 depicts a meter attached to a bar code label in accordance with another exemplary embodiment of the present invention.

The visual meter of the present invention preferably attaches to a removable storage device, which may include any removable storage mechanism capable of storing data, video, audio or other information. According to the preferred embodiment, and as shown in FIGS. 1B and 2, the visual meter includes a display 20 that includes a histogram (or bar graph) 25 and a legend 35. The meter preferably is configured to display a pre-selected parameter to minimize cost. Alternatively, the meter may be designed to display multiple parameters, either on a rotating basis, or as selected by a user.

According to the preferred embodiment, the meter comprises a label that can be attached to a cartridge 40, as shown in FIG. 1B, for example. The label includes both the meter circuitry as well as bar graph 25 and legend 35. According to the preferred embodiment, the legend 35 is pre-printed on the label, although if desired a display element may be used to display the legend. The bar graph 25 preferably is implemented with a plurality of semiconductor display elements that are capable of displaying at least two different colors. Thus, as shown in FIG. 1B, the legend 35 may indicate, for example, the number of read/write errors that were detected during the last read/write operation to the tape cartridge 40. The number of errors is indicated in the bar graph by the darker color portion. Various other parameters could be indicated in similar fashion, including the remaining capacity of the removable storage media, the viability of the removable storage media (good versus bad, for example), the life of the storage media, the number of times the storage media has been loaded or unloaded with data, and the like. As an example of another meter, FIG. 1A shows a histogram that depicts the life of the removable storage media or product. Thus, on the left-hand side, a visual indication of "good" is shown, denoting that the media has ample life remaining. On the right-hand side of the meter is the notation "replace", indicating that the useful life of the media or product has passed. Display elements comprise each of the cells of the histogram, thus depicting the useful life of the media or product, ranging from "good" to "replace." Thus, by visually inspecting the meter display 20 on the surface of the removable storage media, the user can obtain critical information regarding the status of the removable storage media. It should also be noted again that the visual meter shown in FIGS. 1B, 1A and 2 may be used with products (or products being manufactured) other than storage media. The visual meter may be used with any product for which it is desirable to visually indicate a dynamic parameter.

FIG. 1B demonstrates attaching the meter to a tape cartridge, such as an AIT cartridge, with a suitable adhesive. On other removable storage media, there may be insufficient space to permit the meter to attach directly to the removable storage media. In that event, and as shown in FIG. 2, the meter may attach to a bar code label 45, as might for example be necessary with an LTO or SDLT cartridge. As shown in FIG. 2, the bar graph 25 and legend 35 may be mounted horizontally, instead of the vertical arrangement used in FIG. 1B. Other spatial orientations also may be used, as necessary. In addition, it should be noted that multiple display devices may be provided to indicate different parameters. As will be discussed in more detail in relation to FIG. 10, the display device preferably comprises a thin, flexible label that can be easily adhered to a surface of the removable storage media, or to other labels attached to the removable storage media. Preferably the display is capable of maintaining the set value for an extended period of time (on the order of years), without a battery.

Figure 3:
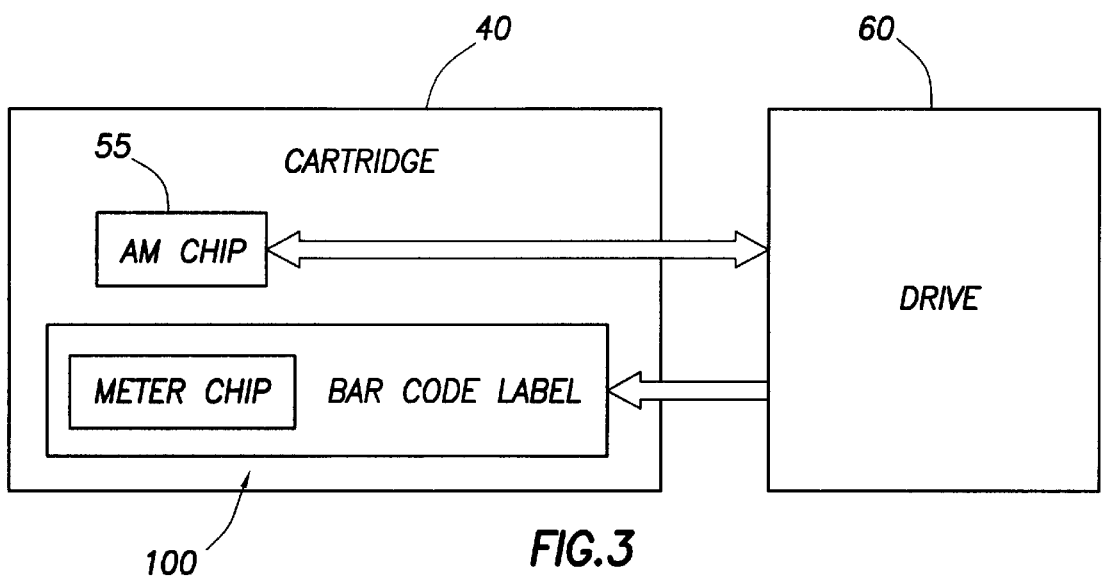
FIG. 3 is a block diagram illustrating one exemplary implementation of a meter constructed in accordance with one embodiment of the present invention.
Figure 4:
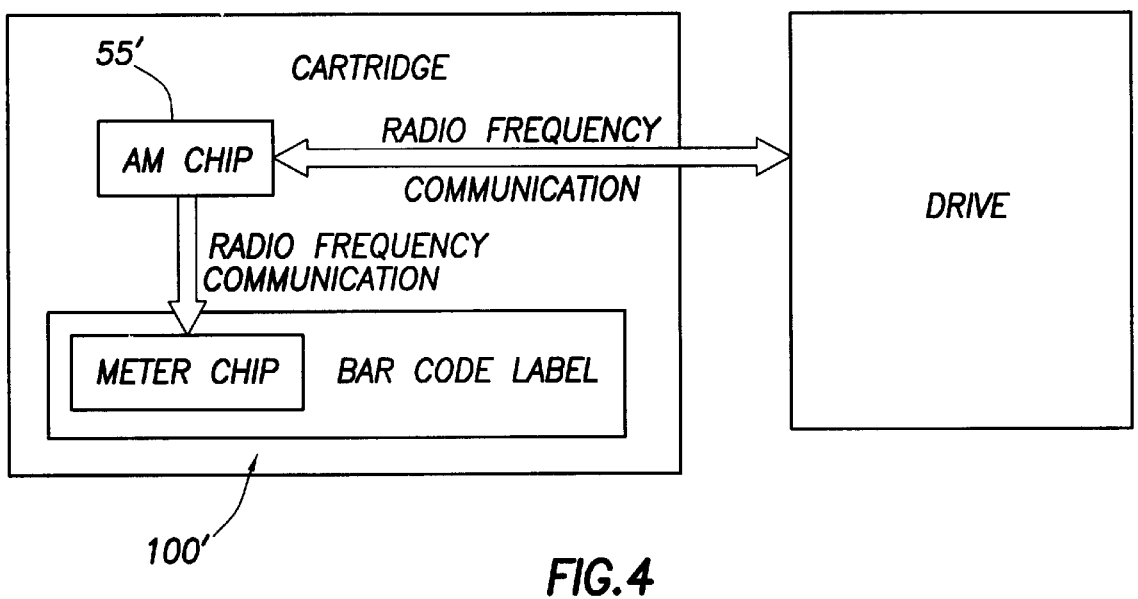
FIG. 4 is a block diagram illustrating a second exemplary implementation of a meter constructed in accordance with a second embodiment of the present invention.
Figure 6:
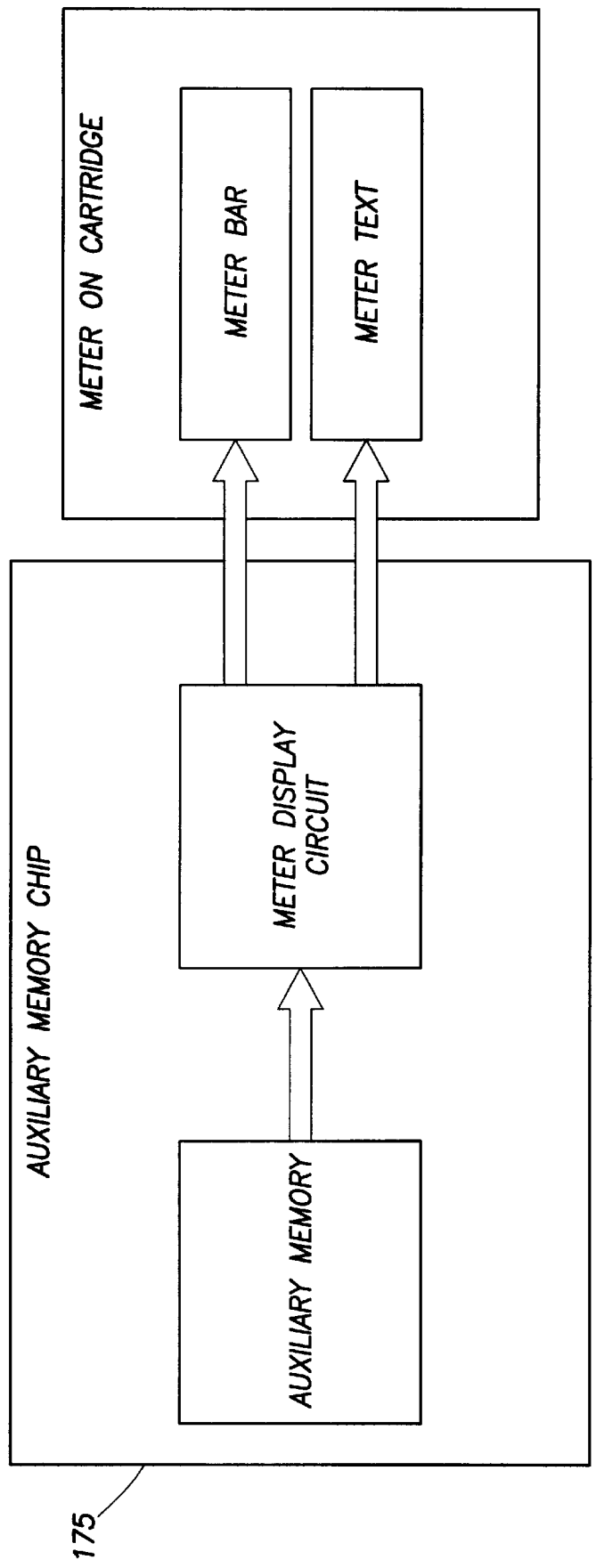
FIG. 6 is a block diagram illustrating a third exemplary implementation of a meter constructed in accordance with a third embodiment of the present invention.

Referring now to FIGS. 3, 4 and 6, various embodiments are possible to enable the meter to receive information regarding one or more parameters of the removable storage media for displaying on the meter display. FIGS. 3, 4 and 6 illustrate three possible embodiments. Other embodiments also are possible based on the concepts discussed below.

Referring initially to FIG. 3, the tape cartridge 40 typically includes an auxiliary memory chip 55 which can be accessed by circuitry in the tape drive 60. The drive circuitry performs read and write operations to the auxiliary memory chip 55 when the cartridge is loaded in the tape drive. The read and write transactions preferably are performed using rf communications between the drive and cartridge. Depending on the removable storage media, it may be preferred to use a hard-wire connection instead of an rf connection. Thus, for example, if the removable storage media comprises a hard drive, it may be preferred to communicate with a visual meter on the hard drive using a hard-wire connection, instead of an rf connection.

According to a first embodiment of the present invention, the meter 100 preferably includes a meter chip and an associated display that attach to the removable storage media or to another label affixed to the storage media. The meter 100 detects write operations from the drive to the auxiliary memory chip, and in response, performs a write operation to a memory device in the meter. Thus, the meter "listens" for rf communications to the auxiliary memory during which parameter information is being stored in the auxiliary memory. The meter 100 then selects a specific parameter or parameters for displaying on the associated display, or else performs an analysis of the data and provides an indication of a parameter that relates to the stored data. Thus, the meter can display parameter status information that is calculated each time the cartridge is loaded with data. As yet another alternative, the visual meter may be designed to simply receive information from the drive circuitry indicating the desired setting of the visual meter, without requiring any calculation or intelligence at the meter. The rf transmission from the drive, which is detected by the meter preferably provides the requisite energy to the meter circuitry that permits the meter to generate the display without the use of a battery or other power source. According to one exemplary embodiment, various meters may be purchased by consumers for attaching to a removable storage media or other product, with different meters dedicated to displaying a specific parameter. Thus, for example, one meter might be provided to indicate capacity, while another might provide information regarding the viability of the product or media.

According to a second embodiment of the present invention, and referring now to FIG. 4, the meter 100' may be designed to receive rf communications from the auxiliary memory chip 55' that mounts in or on the removable storage media. In this embodiment, the auxiliary memory chip 55' may be programmed to periodically transmit its contents or portions of its contents to the meter 100', for displaying one or more parameters on an associated display device.

Figure 5:
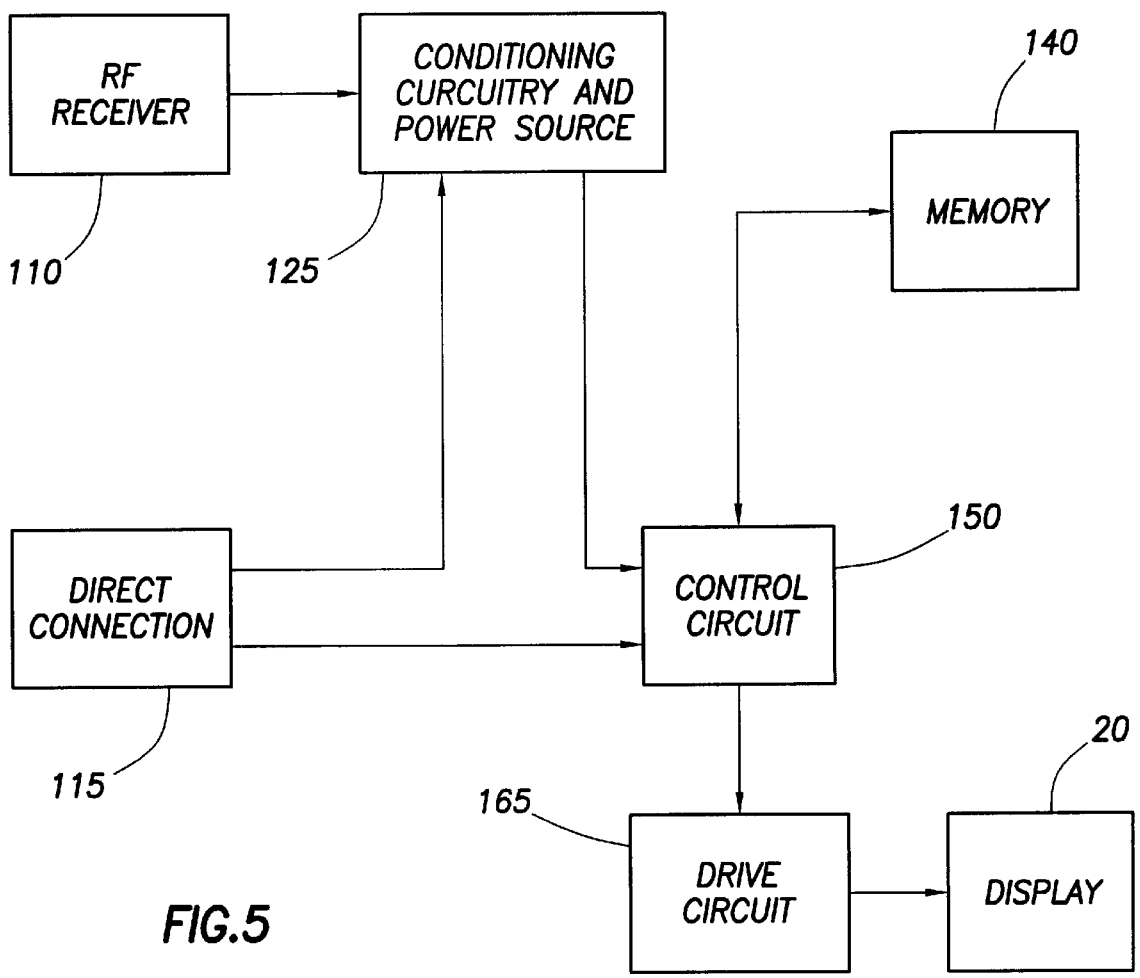
FIG. 5 is a block diagram of the preferred meter circuitry used in the embodiments of FIGS. 3 and 4.

Referring now to FIG. 5, the media meter constructed in accordance with the embodiments of FIGS. 3 and 4 preferably includes an rf receiver 110, conditioning circuitry and power source circuitry 125, a memory device 140, control circuitry 150, drive circuitry 165, and a display device 20. According to the preferred embodiment, at least some of these circuit elements are constructed as an application specific integrated circuit (ASIC). The rf receiver 110 preferably detects rf communications transmitted by the drive and/or the auxiliary memory device, and passes the communication signals to conditioning circuitry and power source circuitry 125. Alternatively, a direct connection (or "receiver") 115 may be provided which directly couples the drive to conditioning circuitry and power source circuitry 125 and control circuitry 150. As will be apparent to one skilled in the art, the direct connection receiver or rf receiver may both be provided in the present invention, or only one of these receivers may be provided to enable communication according to that communication medium. The conditioning circuitry performs any necessary filtering, and converts the received rf signals (or directly transmitted electrical signals) to a digital format. The power source circuitry operates as a parasitic power source, using a portion of the received transmissions to generate sufficient power to operate the electronic circuitry in the meter. The digitized signals are relayed to the control circuitry 150, which determines if the transmissions should be stored in memory device 140. Thus, according to the embodiment of FIG. 3, the control circuitry 150 determines if the received communication comprises a write cycle to the auxiliary memory, and if so, the received communication is stored in memory 140. Similarly, with respect to the embodiment of FIG. 4, the control circuitry 150 determines if the received communication comprises a status communication from the auxiliary memory, and if so, the data is stored in memory 140. The control circuitry may be designed as a processor with some level of programmability, a programmable logic array, or as a hard-wired circuit implementation.

Once new data appears in the memory device 140, the control circuitry 150 preferably selects the portion of the data to be displayed, and formats the data before passing it to the drive circuitry 165. The drive circuitry then provides the necessary signals to drive the display, causing a bar graph (or other graphical representation of the dynamic parameter) to be displayed indicating the status of the desired parameter. The control circuitry 150 may be configured to select a particular parameter, such as capacity, or number of read or write errors, the number of times that a removable storage media has been used to store data, and the like. In that event, the control circuitry 150 will read the relevant parameter information from memory 140. Preferably the status data will be assigned to particular fields or will be partitioned in such a way that the control circuitry 150 can readily identify where in memory 140 the desired information is stored. Alternatively, the control circuitry 150 may be capable of analyzing data to make a determination regarding other parameters relating to the removable storage media. Thus, for example, the control circuitry 150 may be programmed to check the information relating to the number of read and write errors, the number of times that data has been stored on the media, the period of time over which the storage media has been used, and any other parameters that relate to the viability of the product or media. From this information, the control circuitry may execute an algorithm to determine the viability of the product or media, and may provide a display that indicates to the user the viability of the product or media. Referring now to FIG. 6, another embodiment of the meter is shown. According to this embodiment, the meter is incorporated in auxiliary memory chip 175. Consequently, when the contents of the auxiliary memory 175 are altered by the drive circuitry, the meter display circuitry drives the meter bar graph and, if necessary, the meter text to indicate the parameter being displayed. Thus, this implementation supports a variable display as different stored parameters are displayed by the meter display circuitry. To implement a variable display, the control circuitry may periodically change the display by rotating through a pre-selected list of parameters to be displayed, or may respond to an inquiry from a user, which could be made by a suitable input device (such as a button) on the removable storage media or product that causes the control circuitry to cycle through a pre-selected list of display parameters.

Referring now to FIGS. 7A–B, 8A–B and 9A–B, the display device preferably comprises a plurality of display elements in the shape of microspheres 250, such as those manufactured by E-Ink Technologies. These microspheres operate as micro-encapsulated electrophoretic display elements. One such microsphere is shown in each of FIGS. 7A, 8A and 9A. The microspheres 250 are positioned between an upper transparent electrode 220 and a lower electrode 210, which preferably is opaque. As shown in FIG. 7A, the microsphere 250 has a clear shell which is filled with blue dye. White pigments are contained within the shell, and have a positive electrostatic charge. If neither the upper or lower electrode present an electrical charge, then the white pigments remain scattered within the shell, causing the bubble to have a light blue color, as indicated by the shading in FIG. 7B. If, as shown in FIGS. 8A and 8B, a negative voltage is applied to the upper electrode 220 while a positive charge is applied to the lower electrode 210, the white pigment will move toward the upper electrode, causing the microshpere 250 to have a white color. If conversely, the charges are reversed, as shown in FIGS. 9A and 9B to have a positive charge on the upper electrode 220 and a negative charge on the lower electrode 210, the microsphere 250 will have a dark blue color. As will be apparent to one skilled in the art, a bar graph may be configured with multiple microspheres to represent different bars in a bar graph.

Figure 10:
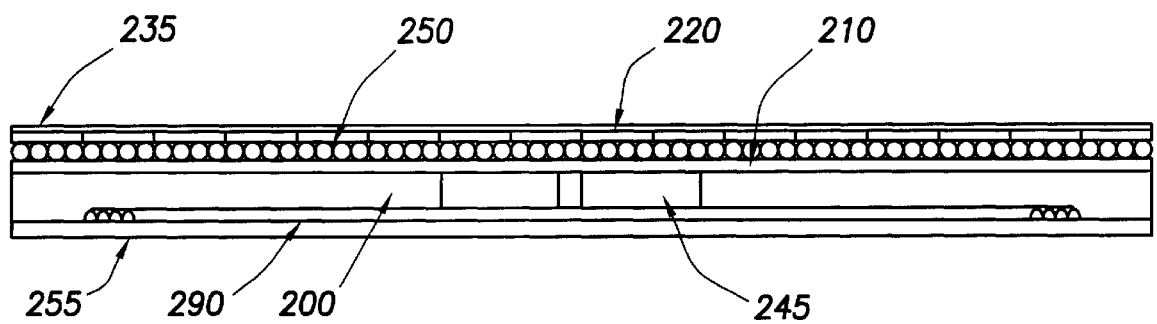
FIG. 10 is a side view of the meter design incorporating the display elements of FIGS. 7A–B, 8A–B and 9A–B, in accordance with the preferred embodiment.

Thus, referring now to FIG. 10, a plurality of microspheres 250 are positioned between multiple sets of electrodes. The density of the microspheres may be on the order of hundred or more microspheres per inch. In the exemplary drawing of FIG. 10, approximately 64 microspheres are shown with sixteen upper electrodes 220, for purposes of illustration. The sixteen electrodes may be considered as sixteen different bars in a bar graph. Thus, the control circuitry and drive circuitry of FIG. 5 may cause the first four bars of the display to have a dark blue color, while the other twelve bars of the display have a white color.

Figure 11:
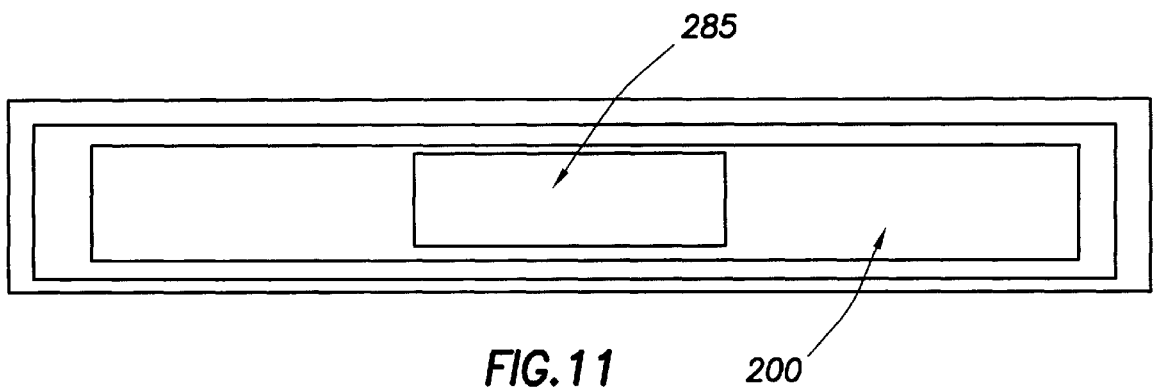
FIG. 11 is a top view of the paper substrate of FIG. 10.
Figure 12:
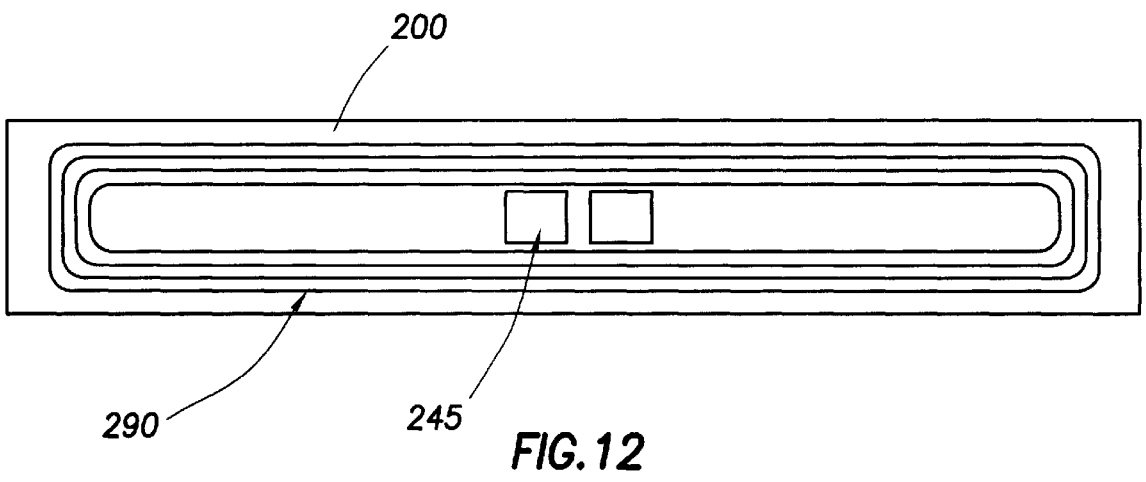
FIG. 12 is a bottom view of the meter design of FIG. 10 in accordance with the preferred embodiment.

Referring still to FIG. 10, the media meter includes a substrate 200, preferably formed of paper, with a lower electrode sheet 210 placed or fabricated on the layer above the substrate 200. In the preferred embodiment, the lower electrode 210 preferably is opaque, but that is not a requirement. The display elements or microspheres 250 of FIG. 7A are deposited on the lower electrode 210, and the upper electrodes 220 are placed or fabricated on the next layer above the display elements 250. The upper and lower electrodes couple to appropriate drive circuitry. The drive circuitry may be located on the electrodes, or may be located separate from the electrodes and couple to the electrodes by conductors. A sheet of mylar 235 and/or another insulative material is then placed across the top of the upper electrodes 220. Integrated circuits 245, such as the rf receiver, control circuitry, and other circuitry depicted in the circuitry of FIG. 5, preferably are positioned in cut-outs 285 in the paper substrate 200, as best viewed in FIG. 11. Referring back to FIG. 10, appropriate conductors (not shown) electrically connect the control circuit IC's 245 to the upper and lower electrodes 220 and 210, respectively. According to the preferred embodiment, and as shown in FIGS. 10 and 12, below the substrate 200 and IC's 245 an antenna loop 290 is formed. The antenna 290 may be formed using any suitable antenna pattern or array, using conventional semiconductor fabrication techniques. A sheet of mylar 255 or other insulative cover preferably is positioned beneath the substrate 200 and antenna 290, as shown in FIG. 10. A sheet of adhesive (not shown) is affixed to the bottom of the mylar sheet 255. According to the preferred embodiment, the media meter has a thickness of approximately 1 millimeter or less, and is flexible.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A label capable of being secured to a product that provides a visual display of a parameter relating to the product, comprising a plurality of upper transparent electrodes;

a plurality of lower electrodes;

a plurality of microspheres positioned between said upper electrodes and said lower electrodes;

a substrate positioned below said plurality of lower electrodes, said substrate receiving one or more integrated circuit that selectively energize some of said plurality of upper electrodes and said plurality of lower electrodes;

an antenna positioned below said plurality of lower electrodes that is capable of receiving rf transmissions from a remote source indicating which upper electrodes and lower electrodes to energize, and wherein said antenna couples to said one or more integrated circuits to provide said rf transmissions to said one or more integrated circuit.

2. A label as in claim 1, further comprising an insulating layer above said plurality of upper electrodes.

3. A label as in claim 1, wherein said substrate includes one or more cutout in which said one or more integrated circuit is received.

4. A label as in claim 3, wherein said antenna is configured in a loop and is positioned beneath said substrate.

5. A label as in claim 1, wherein the plurality of upper electrodes and low electrodes are arranged in pairs, and wherein said one or more integrated circuit selectively energizes pairs of upper and lower electrodes to change the color of said microspheres that are located between said pairs.

6. A label as in claim 1, wherein the label may be adhered to a product to provide a long-term visual indication of a parameter relating to said product.

7. A label as in claim 1, wherein the long-term visual indication is greater than 6 months.

8. A label as in claim 1, wherein the product comprises a removable storage media.

9. A label as in claim 4, wherein a first protective cover is provided above said upper electrodes, and a second protective cover is provided below said antenna.

10. A label as in claim 1, wherein the one or more integrated circuit receives power from the rf transmissions.

* * * * *